United States Patent [19]
Reich

[11] Patent Number: 5,287,626
[45] Date of Patent: Feb. 22, 1994

[54] APPARATUS AND METHOD FOR MEASURING ROTATION ANGLE

[76] Inventor: Dennis A. Reich, P.O. Box 402, Georgetown, Ky. 40324

[21] Appl. No.: 976,530

[22] Filed: Nov. 16, 1992

[51] Int. Cl.[5] .......................................... G01B 7/315
[52] U.S. Cl. ................................. 33/1 N; 33/203.14; 33/534
[58] Field of Search ................ 33/1 N, 1 PT, 203.14, 33/203.13, 203.12, 203, 534, 536, 537, 568, 569

[56] References Cited

U.S. PATENT DOCUMENTS

| | | | |
|---|---|---|---|
| 3,876,831 | 4/1975 | Wickham et al. | 33/1 PT |
| 4,389,793 | 6/1983 | Butler | 33/203.14 |
| 4,443,951 | 4/1984 | Elsasser et al. | 33/203.13 |
| 4,690,557 | 9/1987 | Wiklund | 33/288 |
| 4,897,926 | 2/1990 | Altnether et al. | 33/203.14 |
| 4,924,591 | 5/1990 | Brodu | 33/203.14 |
| 5,014,227 | 5/1991 | Kling et al. | |

Primary Examiner—William A. Cuchlinski, Jr.
Assistant Examiner—C. W. Fulton
Attorney, Agent, or Firm—King and Schickli

[57] ABSTRACT

An apparatus for measuring the rotation angle of an object includes a floating rotary support for the object. The rotary support is mounted on a frame so as to allow free lateral movement in X and Y coordinate directions. A cooperating two-point cursor and digitizer tablet are provided to identify X and Y coordinates for the object in a second, relatively rotated position. Specifically, either the cursor or the digitizer tablet is mounted to the rotary support while the other is held stationary on the frame. Additionally, a processor is provided for calculating the rotation angle of the object based upon the X and Y coordinates determined for the rotated position. A method for measuring the rotation angle is also disclosed and claimed.

17 Claims, 2 Drawing Sheets

APPARATUS AND METHOD FOR MEASURING ROTATION ANGLE

TECHNICAL FIELD

The present invention relates generally to the measurement field and, more particularly, to an improved apparatus and method for measuring the relative change in position of an object in two or three dimensions including angle of rotation as that object is moved between a first, home position and a second, relatively rotated position.

BACKGROUND OF THE INVENTION

In order to determine proper installation and operation of an object, it is often necessary to confirm that the rotation angle of the object falls within or meets certain specifications. For example, the steering geometry and, particularly, the rotation angle of the wheels as they are rotated by the steering linkage is an important consideration to the proper operation of a motor vehicle. Accordingly, it is necessary to accurately assess the rotation angle of the wheels when cut to the left or right.

While many devices have been built in the past for this purpose, none are able to effectively compensate for the "floating axis" about which each wheel rotates. More specifically, because of the caster of the wheel, the rotation axis shifts when the wheel is turned by operation of the steering wheel. This shift in the rotation axis, if not effectively compensated for, will adversely effect the accuracy of any measurement of true rotation angle.

SUMMARY OF THE INVENTION

Accordingly, it is a primary object of the present invention to provide a relatively simple and inexpensive apparatus and straightforward method to measure displacement of an object in two or three dimensions including the rotation angle of an object.

Another object of the present invention is to provide an apparatus for measuring the rotation angle of an object providing reliable performance over a long service life.

Still another object of the invention is to provide an apparatus for measuring rotation angle that eliminates the need for a mechanical linkage and thereby provides more efficient operation as well as more sensitive, accurate measurement.

Yet another object of the invention is to provide an apparatus and method for measuring the rotation angle of an object that allows particularly accurate measurement and is capable of fully and accurately compensating for a floating center point or rotation axis of the object.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus is provided for measuring the relative displacement and rotation angle of an object. In accordance with the broadest aspects of the present invention the apparatus includes a cooperating two-point cursor and digitizer tablet. Either the cursor or the tablet is operatively connected to the object for movement therewith. The other of the cursor or digitizer tablet remain relatively stationary. Additionally, the apparatus includes a means for calculating the rotation angle of the object from the X and Y coordinates of the two points of the cursor in the first and second positions.

For certain applications, such as where measuring the rotation angle of a front wheel of a vehicle is desired, the apparatus may include a frame. A floating rotary support or turntable for supporting the object for which the rotation angle is to be measured is mounted to the frame. Specifically, the floating rotary support is made from relatively lightweight material and rests on a captured ball bearing array mounted on the frame. The ball bearing array effectively frees the rotary support for lateral movement relative to the frame in both X and Y coordinate directions.

The apparatus also includes a cooperating cursor and digitizer tablet. One of the cursor or the digitizer tablet is fixed to the rotary support and thus, the object resting on the support for rotational movement therewith while the other is either fixed to the frame or rests upon the floor so as to remain stationary. The cooperating cursor and digitizer tablet function together to identify the X and Y coordinates of at least a second, relatively rotated position of the object. Additionally, the apparatus includes a means, such as a processor, for calculating the rotation angle of the object from the X and Y coordinates of the second, relatively rotated position.

Preferably, the floating rotary support may also include a centering shaft mounted to and extending from the rotary support in a Z coordinate direction. More particularly, the centering shaft is mounted to the rotary support so as to substantially underlie the axis of rotation of the supported object.

The apparatus also includes a mechanism for quickly and accurately returning the rotary support to the first, home position. Specifically, the centering shaft includes a segment of square cross-section as well as a pair of cooperating, opposed cylinders mounted to the frame. Each cylinder includes a rod having a substantially V-shaped distal end. As the ends of the rods are extended toward one another, they engage the centering shaft along the square cross-section segment. When fully extended together, the centering shaft is firmly gripped between the rods and moved with the support into the home position.

Advantageously, the cursor of the present invention has a unique two-point or cross hair design that allows full compensation to be made for any floating center point or rotation axis of the object for which rotation angle is being measured. More specifically, the first and second points of the cursor are provided a fixed, known linear distance from each other. As a result of this arrangement and in conjunction with the utilization of a floating rotary support or direct connection to the object, it is possible to accurately identify the rotation angle of an object having a floating rotation axis.

Specifically, the rotation angle is calculated from the relative displacement of the first and second points in the second, relatively rotated position as compared to the points in the first, home position, by operation of trigonometric relation and analysis. Any number of trigonometric equations may be utilized for this purpose. Additionally, it should be appreciated that the present apparatus may be utilized to accurately measure the direction and distance of displacement of the rotation axis as well as the rotation angle. This, for example, allows the accurate determination of the caster of the wheel of a vehicle.

In accordance with yet another aspect of the present invention, a method is provided for accurately measuring the rotation angle of an object between a first, home position and a second, relatively rotated position. The method broadly encompasses the step of operatively connecting one of the cooperating two-point cursor and digitizer tablet of the type described to the object for movement therewith. The other of the cursor and tablet is maintained stationary. Next is the step of determining the X and Y coordinates of both points in the home position. Then is the rotating of the object to the second, relatively rotated position and the determining of the X and Y coordinates of both points in that position. Finally, the method concludes with the calculating of the rotation angle from the X and Y coordinates of both points of the two point cursor. Where the points in the home position are known, this may be done by simply utilizing the coordinates of the two-points in the second relatively rotated position as they reflect relative displacement.

The method, utilizing the wheel rotation angle measuring apparatus described above, includes the step of positioning the wheel on the rotary support in a set and known first, home position. In the home position, the coordinate position of the first and second points 34, 36 of the cursor 32 are known and found on the Y coordinate axis. The method then includes the step of rotating the wheel to a second, relatively rotated position. Then come the steps of determining the X and Y coordinates of both points of the cursor for the second, relatively rotated position of the wheel and the calculating of the rotation angle. That calculation is completed in accordance with any one of a number of trigonometric equations.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
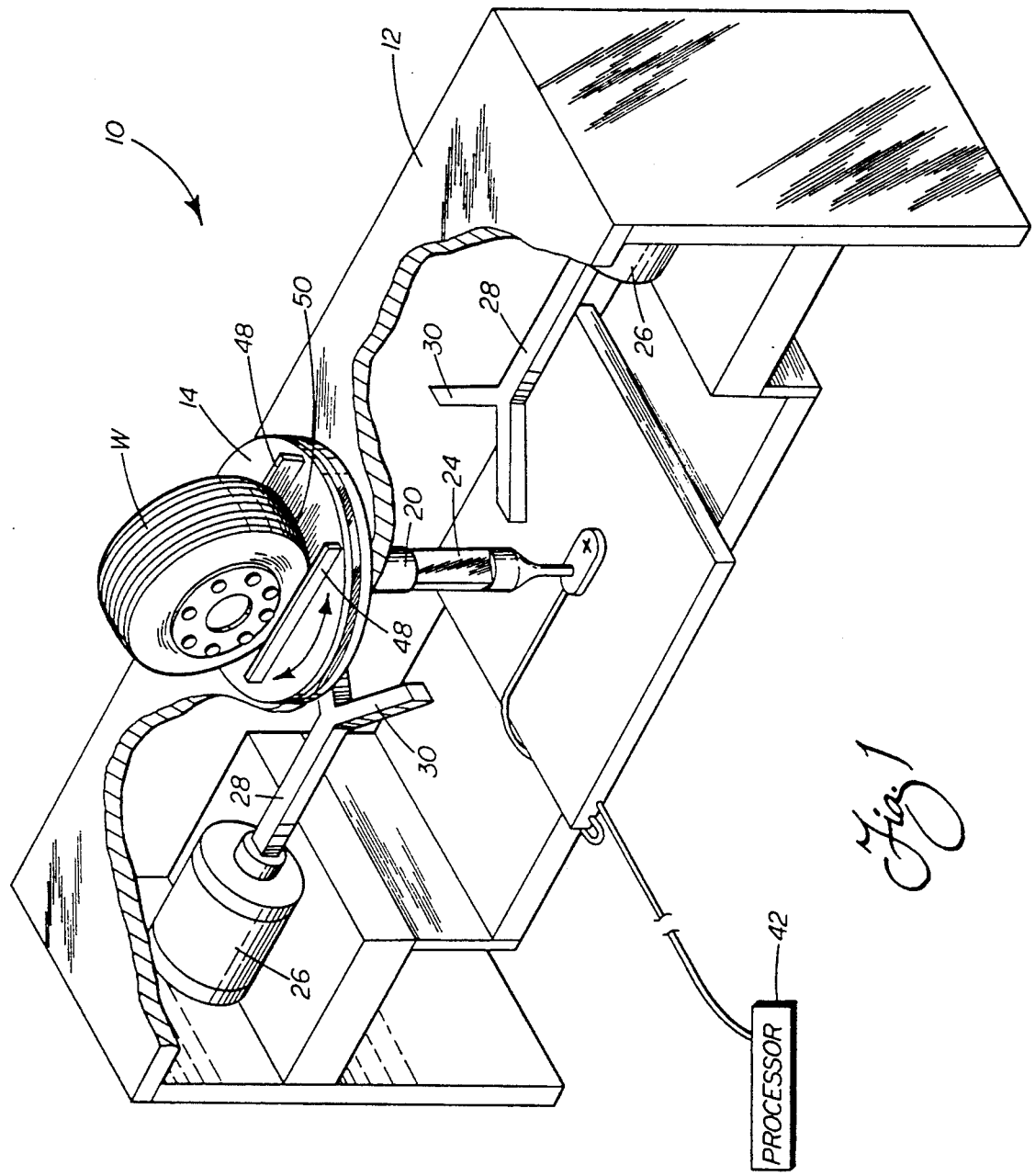
FIG. 1 is a schematical representation of the apparatus of the present invention for measuring the rotation angle of an object.

Reference is now made to FIG. 1 schematically showing the apparatus 10 of the present invention for measuring the rotation angle of an object. The apparatus 10 and method will be described with respect to determining the rotation angle of the wheel W on a vehicle (not shown). It should be recognized, however, that the apparatus 10 and method may be utilized to measure the rotation angle of other objects as well. Further, while the description of the apparatus 10 is being provided in conjunction with a single wheel, it should be appreciated that an identical apparatus may be provided under the opposite wheel of the vehicle to provide a measurement of the rotation angle of that wheel as well.

As should be appreciated from viewing FIG. 1, the apparatus 10 includes a frame 12 preferably constructed of steel so as to support the weight of a vehicle. A ramp (not shown) may be provided so as to allow the vehicle to be driven or pulled up onto the frame 12.

Figure 3:
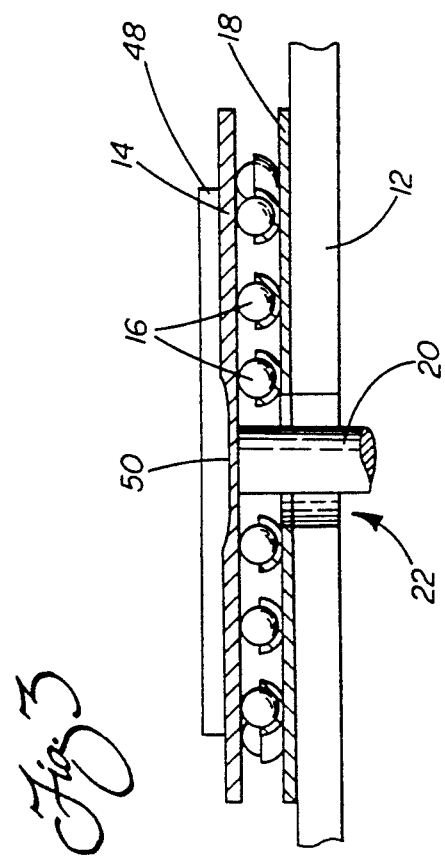
FIG. 3 is a detailed sectional view of the rotary disk and captured ball bearing support arrangement.

As shown, a rotary support or turntable 14 is mounted to the frame 12. As shown in detail in FIG. 3, the rotary support 14 is supported upon a radial array of ball bearings 16 captured by a plate 18 on the frame 12. As a result of this arrangement, it should be appreciated that the rotary support 14 is capable of free floating movement in both X and Y coordinate directions relative to the frame 12.

Figure 2:
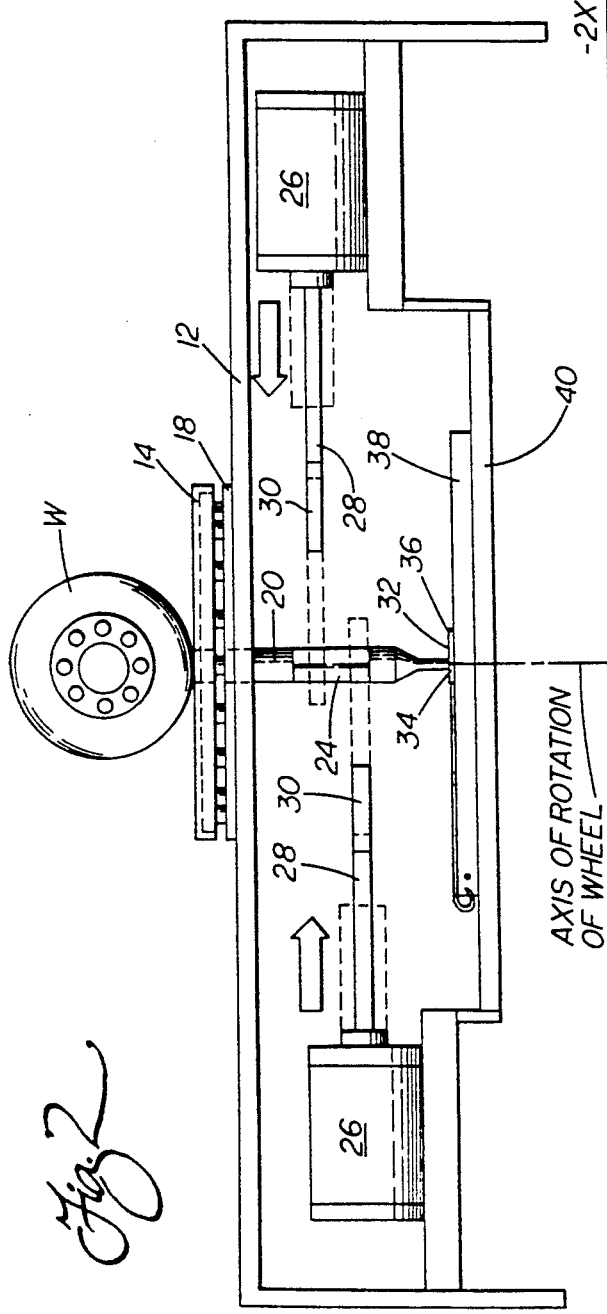
FIG. 2 is a schematical side elevational view of the apparatus of FIG. 1.

As best shown in FIG. 2, a centering shaft or post 20 is mounted to the underside of the rotary support 14. Preferably, the post 20 is mounted to the center of the disk 14 and extends through an opening 22 provided in both the capture plate 18 and frame 12. As shown, the centering shaft 20 extends in a Z coordinate direction or orthogonal to the lateral shifting movement of the rotary support 14.

An intermediate segment 24 of the shaft 20 includes a square-shaped cross-section. This segment 24 operates in conjunction with a pair of opposed, cooperating cylinders 26 to allow the rotary support 14 to be efficiently and accurately positioned in a first, home position.

More particularly, each cylinder 26 includes a rod 28 having a substantially V-shaped distal end 30. As the rods 28 are extended from the cylinders 26 (note phantom showing in FIG. 2), the distal ends 30 engage the square sectional segment 24 of the centering shaft 20 displacing the shaft and, therefore, the rotary support 14 to a centered or home position. More specifically, when the rods 28 are fully extended, sufficient clearance is provided between the distal ends 30 to receive the segment 24 with the angle formed by the V-shaped ends matching the profile or corner angles of the segment 24. Of course, the ends 30 engage the segment 24 in an over/under relationship so as to provide the necessary vertical clearance for full extension and centering.

A cursor 32 is mounted on the distal end of the centering shaft 20. The cursor 32 comprises a two-point cursor having a fixed, linear distance between a first point or cross hair 34 and a second point or cross hair 36. As the cursor 32 is fixed to the end of the centering shaft 20, the cursor is operatively connected to the wheel W and rotates when the wheel is rotated and turns the support 14. Of course, it should be appreciated that in accordance with the broadest aspects of the present invention any method of connecting the cursor 32 to the object for which rotation angle is being measured may be utilized.

A digitizer tablet 38 is positioned on an underlying shelf 40 of the frame 12. A digitizer tablet suitable for this purpose is the Summa Sketch II manufactured by Summa Graphics Corporation of Seymour, Conn. Less than ⅛ inch of clearance is provided between the cursor 32 and the digitizer tablet 38 so as to insure the proper and accurate recording of the rotation angle in the manner described in detail below.

As shown, the cursor 32 and digitizer tablet 38 are connected to a processor 42. The processor 42 may be utilized in the manner described to calculate the maximum rotation or steering angle of the wheel W in either direction even though the wheel moves laterally off center due to the caster of the wheel as it is mounted on the vehicle.

More specifically, the efficient and accurate measurement of the rotation angle, of the floating rotation axis of the wheel W is possible as a result of a number of structural features of the present invention. More particularly, the ball bearing array 16 that supports the rotary support 14 readily allows the support to move or shift in the X and Y coordinate directions in response to any input from the wheel W. Specifically, the rotary support 14 is relatively lightweight when compared to the weight of the vehicle carried by the wheel W and the ball bearings 16 provide a very low friction supporting structure. Accordingly, drag and resistance to any lateral shifting of the rotation axis of the wheel W as the wheel is turned by operation of the steering wheel of the vehicle is minimized. As a result, the apparatus 10 is particularly sensitive to any shifting movement of the rotation axis of the wheel W occurring during rotation and a more accurate determination of the steering geometry and particularly the rotation angle and even the caster of the wheel is possible.

Further, it should be appreciated that the apparatus 10 functions more efficiently through operation of the cursor 32 and digitizer tablet 38 while the floating rotary support effectively eliminates cumbersome mechanical linkages. Of course, as mechanical linkages inherently include drag and resistance as well as some slop, the elimination of a mechanical linkage is a significant benefit. Specifically, not only does elimination allow a more accurate determination of rotation angle, but the resulting simplified structure is particularly easy to construct and provides reliable and more accurate operation over an extended service life.

The method of operation of the apparatus 10 will now be described in detail. Initially, the rods 28 are extended from the cylinders 26 so that the distal ends 30 engage the segment 24 of the centering shaft 20. When fully extended, these rod ends 30 effectively center the shaft 20. As a result, the rotary support 14 fixed thereto is positively brought to a first, home position. Typically, this position has known X and Y coordinates for the two points 34, 36 of the cursor 32 allowing rotation angle to be determined solely from the X and Y coordinates of the two points in the second, relatively rotated position. In some applications, however, the X and Y coordinates of the home position may not be known. In those instances, the X and Y coordinates for both points in both position may be readily determined through operation of the cursor 32 and digitizer tablet 38. This allows determination of the displacement of the two points of the cursor for calculating rotation angle.

With the rotary support 14 held in the home position by operation of the cylinders 26, the object, in this illustration the wheel W of a vehicle, is positioned substantially over the center of the rotary support 14. Advantageously, exact alignment is not required for proper operation and accurate measurement. Particularly, the vehicle may be pulled up onto the frame 12 by means of a ramp not shown. The vehicle is then pulled forward and the wheel W is guided so as to be centered on the support 14; that is, substantially vertically aligned over the shaft 20 and cursor 32. Specifically, spaced centering guides 48 may be provided on the support 14. These guides 48 project upwardly and are spaced from one another to just provide sufficient clearance to receive the wheel W and provide side-to-side alignment. A slot or depression 50 may be provided in the face of the support 14 to receive the wheel and provide fore-and-aft alignment. As a result of this procedure, the first, home position of the wheel W has known X and Y coordinates for the two points 34, 36 of the cursor 32 (e.g. resting on the Y axis).

Next, the cylinders 26 are actuated to retract the rods 28 and move the V-shaped ends 30 away from the shaft 20 (see FIG. 1 and full line position in FIG. 2). This frees the shaft 20 and support 14 attached thereto for movement. The steering wheel of the vehicle is then operated to move the wheel W to a second, relatively rotated position. As the wheel W is rotated, the axis of rotation is shifted laterally due to the caster or angular inclination of the wheel W with respect to true vertical as it is mounted to the vehicle. The floating rotary support 14 freely follows this shift. Upon reaching the second, relatively rotated position, the two-point cursor 32 and cooperating digitizer tablet 38 are utilized to record the X and Y coordinates of both points 34 and 36 in the second, relatively rotated position.

Specifically, the first point 34 of cursor 32 is connected to a set of normally closed contacts while the second point 36 is connected to a pair of normally open contacts. Accordingly, after reaching the second, relatively rotated position, the first point 34 of cursor 32 cooperates with the digitizer tablet 38 to read and record the X and Y coordinates, $X_1$, $Y_1$ of the first point. The processor 42 then operates a relay (not shown) to open the contacts connected to the first point 34 and close the contacts connected to the second point 36. The X and Y coordinates, $X_2$, $Y_2$ of the second point 36 of the second, relatively rotated position are then read and recorded. The two recorded points, $(X_1, Y_1)$ and $(X_2, Y_2)$ of the second relatively rotated position are then utilized by the processor 42 to calculate the resulting rotation angle.

Figure 4:
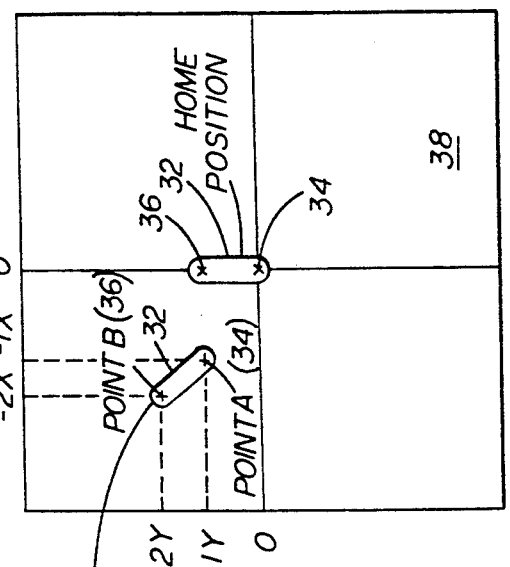
FIG. 4 is a schematical plot to aid in demonstrating just one of the calculations that may be completed to figure the rotation angle utilizing the present apparatus and method.

More particularly with reference to FIG. 4, an example plot is provided showing the first, home position and the first and second points A (marked by cross hair 34), B (marked by cross hair 36), respectively of the second, relatively rotated position. In this example, the two points (0,0) and (0,1) of the home position are known and assigned to fall upon the Y axis. Accordingly, they do not enter into the determination of displacement of the object and, therefore, the calculation of rotation angle. Only the X and Y coordinates for points A and B are required for this purpose. The X and Y coordinates for point A are: $X_1 = -1.5$ and $Y_1 = 1.0$; and point B:

$X_2 = -2.0736$ and $Y_2 = 1.8192$. Thus, in accordance with the trigonometric function:

$$\text{Angle of rotation} = inv \text{ TAN} \left[ \frac{|X_2 - X_1|}{|Y_2 - Y_1|} \right]$$

or $$\text{Angle of rotation} = inv \text{ TAN} \left[ \frac{|-2.0736 - -1.5|}{|1.8192 - 1.0|} \right] = 35°.$$

It, of course, should be appreciated that other trigonometric equations may be utilized to determine the rotation angle. For example, since the linear distance between the two points 34, 36 is known, sine and cosine may also be utilized. In fact, the equation utilized is determined by the X and Y quadrant in which the points A and B of the second, relatively rotated position are identified and the position of the points of the cursor 32 when the object is in the home position.

Advantageously, it should also be appreciated that the present apparatus and method may be utilized to calculate the caster of the wheel. Specifically, by continuously picking points during rotation of the wheel from the home position to the fully rotated position, the arc of movement may be determined allowing this calculation.

In summary, numerous benefits result from employing the concepts of the present invention. Specifically, the apparatus 10 is a simplified structure effectively eliminating all mechanical linkages. Only a very lightweight rotary disk 14 including a low friction mounting is laterally shifted with the object as the object, for which rotation angle measurement is desired, is rotated. Accordingly, there is little drag and resistance and any flotation of the rotation axis of the object is accurately represented. Further, the novel two-point cursor 32 allows the apparatus 10 to fully compensate for any shifting of the rotation axis of the object and thereby provide a completely accurate measurement of the rotation angle. This has not been possible with the rotation angle measuring apparatus of the prior art.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, while not thought to be as convenient, the digitizer tablet 38 could be mounted to the underside of the rotary disk 14 for rotation therewith and the cursor 32 mounted to the frame to remain relatively stationary. Further, the invention could be utilized in the machining field to determine the position and rotation angle of a workpeice relative to a machine tool.

The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. An apparatus for measuring the relative change in position of an object in two or three dimensions including angle of rotation as said object is moved between a first, home position and a second, relatively rotated position, comprising:
    a frame;
    a floating rotary support for the object for which rotation angle is to be measured, said support being mounted to said frame and allowing free lateral movement relative to said frame in X and Y coordinate directions;
    means for positioning said support into the home position, said positioning means including a centering shaft mounted to and extending from said support in a Z coordinate direction, said centering shaft including a segment of square cross-section and a pair of opposed cylinders mounted to said frame, each cylinder including a rod having a substantially V-shaped distal end for engaging said segment of said centering shaft having a square cross-section and moving said rotary support to said home position;
    a cooperating cursor and digitizer tablet to identify X and Y coordinates of at least said second, relatively rotated position of said object, one of said cursor and digitizer tablet being fixed to said rotary support for movement therewith, the other of said cursor and digitizer tablet remaining stationary; and
    means for calculating the rotation angle of said object from the X and Y coordinates of at least the second, relatively rotated position.

2. The apparatus set forth in claim 1, wherein said floating rotary support rests upon a captured ball bearing array mounted to said frame.

3. The apparatus set forth in claim 1, wherein said support rests upon a captured ball bearing array mounted to said frame.

4. The apparatus set forth in claim 1, wherein said cursor is mounted to said centering shaft.

5. The apparatus set forth in claim 4, wherein said cursor is a two-point cursor, having a first point a known, fixed linear distance from a second point, whereby said rotation angle is calculated from a first point of said second, relatively rotated position having coordinates $X_1$, $Y_1$ and a second point of said second, relatively rotated position having coordinates $X_2$, $Y_2$ by trigonometric relation.

6. The apparatus set forth in claim 1, wherein said cursor is a two-point cursor and said digitizer tablet and cursor also identify X and Y coordinates of said first, home position and all points inbetween said first, home position and second relatively related position so as to allow determination of the rotation arc of the object.

7. The apparatus set forth in claim 6, wherein a first of said two points of said cursor is centered relative to said support and aligned with the rotation axis of said object and a second of said two points of said cursor is a known, fixed linear distance from said first point, whereby said rotation angle is calculated from a first point of said second, relatively rotated position having coordinates $X_1$, $Y_1$ and a second point of said second, relatively rotated position having coordinates $X_2$, $Y_2$ by trigonometric relation.

8. A method for measuring the relative change in position of an object in two or three dimensions including angle of rotation as said object is moved between a first, home position and a second, relatively rotated position utilizing a floating rotary support, a two-point cursor and a digitizer tablet, comprising the steps of:

positioning said object on said floating rotary support in a home position with said rotation axis of said object aligned with one point of said two point cursor;

rotating said object to said second, relatively rotated position;

determining X and Y coordinates for two points at said second, relatively rotated position of said object utilizing said two point cursor and said digitizer tablet; and calculating said rotation angle from said X and Y coordinate of said two points.

9. The method set forth in claim 8, including determining X and Y coordinates for said first, home position.

10. The method set forth in claim 8, including determining an arc of rotation of said object between said first, home position and said second, relatively rotated position.

11. An apparatus for measuring the relative change in position of an a wheel of a vehicle in two or three dimensions including angle of rotation as said wheel is rotated about a rotation axis, comprising:

a frame;

a floating rotary support for the wheel for which rotation angle is to be measured, said support being mounted to said frame and allowing free lateral movement of said support relative to said frame in X and Y coordinate directions;

means for centering the rotation axis of said wheel on said floating rotary support, said centering means including a pair of cooperating, upstanding guides mounted to said rotary support and defining a space therebetween to just receive said wheel so as to provide side-to-side alignment and a depression formed in said support to receive said wheel so as to provide fore-and-aft alignment;

a cooperating cursor and digitizer tablet to identify X and Y coordinates of at least said second, relatively rotated position of said wheel, one of said cursor and digitizer tablet being fixed to said rotary support for movement therewith, the other of said cursor and digitizer tablet remaining stationary; and means for calculating the rotation angle of said wheel from the X and Y coordinates of said second, relatively rotated position.

12. The apparatus set forth in claim 11, further including means for positioning said rotary support into a home position.

13. The apparatus set forth in claim 12, wherein said positioning means includes:

a centering shaft mounted to and extending from said rotary support in a Z coordinate direction, said centering shaft including a segment of square cross-section; and a pair of opposed cylinders mounted to said frame, each cylinder including a rod having a substantially V-shaped distal end for engaging said square portion of said centering shaft and moving said rotary support to a home position.

14. The apparatus set forth in claim 13, wherein said cursor is a two-point cursor having a first point centered relative to said shaft and said rotation axis of said wheel and a second point a known, fixed linear distance from said first point whereby said rotation angle is calculated from a first point of said second relatively rotated position having a coordinate $X_1$, $Y_1$ and a second point of said second, relatively rotated position having coordinate $X_2$, $Y_2$ by trigonometric relation.

15. An apparatus for measuring the relative change in position of an object in two or three dimensions including angle of rotation as said object is moved between a first, home position and a second, relatively rotated position, comprising:

a two-point cursor having a known, fixed linear distance separating said first point and said second point;

a digitizer tablet cooperating with said two-point cursor to identify X and Y coordinates of at least said second, relatively rotated position of said object;

one of said two-point cursor and digitizer tablet being operatively connected to said object for movement therewith, the other of said two-point cursor and digitizer tablet remaining relatively stationary; and means for calculating the rotation angle of said object from at least the X and Y coordinates of both points of said cursor in said second, relatively rotated position.

16. The apparatus set forth in claim 15, wherein said means for calculating the rotation angle of said object utilizes X and Y coordinates of both points of said cursor in said first, home position and both points of said cursor in said second, relatively rotated position when said X and Y coordinates of said home position are unknown.

17. A method for measuring the relative change in position of an object as that object is moved between a first, home position and a second, relatively rotated position utilizing a two-point cursor and cooperating digitizer table, comprising the steps of:

operatively connecting one of said two-point cursor and digitizer tablet to said object for movement therewith;

maintaining the other of said two-point cursor and digitizer tablet relatively stationary;

determining the X and Y coordinates of said first, home position for both points of said two-point cursor;

rotating said object to said second relatively rotated position;

determining the X and Y coordinates of said second, relatively rotated position for both points of said two-point cursor;

calculating said rotation angle from said X and Y coordinates of both points of said two point cursor in at least said second, relatively rotated position.

* * * * *